US005621829A

United States Patent [19]
Ford

[11] Patent Number: 5,621,829
[45] Date of Patent: Apr. 15, 1997

[54] FIBER OPTIC SWITCHING DEVICE AND METHOD USING FREE SPACE SCANNING

[75] Inventor: Joseph E. Ford, Oakhurst, N.J.

[73] Assignee: Lucent Technologies Inc., Murray Hill, N.J.

[21] Appl. No.: 626,653

[22] Filed: Apr. 2, 1996

[51] Int. Cl.[6] ............................................. G02B 6/26
[52] U.S. Cl. ......................... 385/22; 385/16; 385/17; 385/18; 385/24; 385/31; 385/33; 385/115; 385/116; 385/119
[58] Field of Search ........................... 385/15, 16, 17, 385/18, 22, 23, 24, 25, 27, 31, 115, 116, 119, 33, 34, 36, 37

[56] References Cited

U.S. PATENT DOCUMENTS

| | | | |
|---|---|---|---|
| 3,892,468 | 7/1975 | Duguay | 385/115 X |
| 3,925,727 | 12/1975 | Duguay | 385/119 X |
| 4,365,863 | 12/1982 | Broussaud | 385/17 X |
| 4,498,730 | 2/1985 | Tanaka et al. | 385/18 X |
| 4,626,066 | 12/1986 | Levinson | 385/22 X |
| 4,762,391 | 8/1988 | Margolin | 385/119 X |
| 5,159,656 | 10/1992 | Goldstein | 385/116 |
| 5,400,428 | 3/1995 | Grace | 385/115 |

*Primary Examiner*—Brian Healy

[57] ABSTRACT

An optical switching device and method for selectively optically connecting at least one input fiber in a fiber bundle to at least one output fiber in a fiber bundle. To perform the optical switching, a light directing mechanism is provided proximate a face of a fiber bundle that contains the input fiber. The light from the input fiber is directed toward the output fibers by varying the orientation of the light directing mechanism relative the face of the fiber bundle. The light directing mechanism thereby enables the light from the input fiber to be selectively directed to each of the output fibers. By selectively controlling the orientation of the light directing mechanism, the light from the input fiber can be scanned to any number of output fibers, thereby producing a 1×N optical switch.

24 Claims, 3 Drawing Sheets

5,621,829

FIBER OPTIC SWITCHING DEVICE AND METHOD USING FREE SPACE SCANNING

FIELD OF THE INVENTION

The present invention relates to fiber optic switches used for optically connecting at least one optical fiber to at least one other optical fiber.

BACKGROUND

There are many applications in the prior art that require the selective switching between optical fibers, wherein a signal traveling along a source fiber is selectively directed to a number of other optical fibers. One such prior art application is optical time domain reflectometry (OTDR), wherein fiber link integrity is monitored by sending short optical pulses into fibers and measuring the back reflections as a function of time. In OTDR, the light source of a testing apparatus is selectively coupled to the fibers in a network, thereby providing a means for testing each of the fibers within the network. However, in order to test all of the fibers contained within a network, the output of the testing light source must be switched to each of the fibers in the network during the testing period.

During an OTDR testing procedure, a single OTDR testing apparatus is typically shared by a large number (N) of fibers in a network using a 1×N switching arrangement. Arbitrarily large switches have been constructed from smaller banks of optomechanical switches. However, as the smaller banks of optomechanical switches are combined, the cost of the switching configuration grows proportionately.

A simple way to provide optical fiber switching has been to perform the switching manually, via manually operated switchboard panels. Such switchboard panels use mechanically manipulated connectors. However, the use of mechanically operated switchboard panels is limited to applications where the number of fibers to be switched is relatively small and a slow switching time is acceptable.

Switching applications that require a rapid switching response and include a large number of optical fibers, typically use automated switching devices. Certain optomechanical switches have a switching response of the order 10 ms–50 ms, which is far more rapid than is possible for a manually operated switchboard panel. Furthermore, optomechanical switches have good crosstalk, back reflection, insertion loss characteristics and are relatively inexpensive compared to faster integrated optics switches. In optomechanical switches, a lensed input fiber is mechanically moved across a bank of lensed output fibers. As the lensed input fiber passes each lensed output fiber, the optical signal from the lensed input fiber is optically transferred to the lensed output fiber.

Since optomechanical switches require that a lensed input fiber be mechanically moved across a bank of lensed output fibers, optomechanical switches are well adapted for applications where output fibers in a bank are sequentially coupled to a source fiber, such as in the previously described OTDR testing procedure.

For conventional optomechanical switches, microlenses must be aligned to each fiber being tested. In other conventional switching arrangements, such as those that use electro-optic waveguides, alignment procedures to align the switching device to each fiber being tested must also be employed. In applications requiring larger switches, the cost of fiber alignment is the dominant cost, wherein the cost of aligning the switching device is more expensive than the switching device itself. As a result, the overall cost of using a switching assembly has been directly proportional to the number of fibers to be switched.

In MULTIPOSITIONAL OPTICAL-FIBRE SWITCH, by Tomlinson et al., *ELECTRONICS LETTERS*, Vol. 15, No. 6 pp. 192 et seq. (15 Mar. 1979), an optical switch is disclosed that employs a free space optical arrangement, wherein a signal from a source fiber is reflected through an optical system and redirected to other fibers. This switch uses of a quarter period graded-refractive-index rod lens, wherein the input and the output fibers are arranged in a circular configuration. An input fiber is placed at the center of the graded-refractive-index rod lens. The signal from the input fiber passes through the center of the lens, reflects off a rotating mirror and is directed to one of the output fibers that are positioned along a circular path around the center input fiber. However, achieving and maintaining optical alignment of the circular configuration is difficult and costly. This switch configuration is also limited in its application because the spot positioning accuracy is insufficient for single mode fibers.

A need therefore exists in the art for a low cost optical fiber switch that is capable of rapidly switching a large number of fibers and does not require individual fiber alignment, yet is adaptable to a wide variety of fiber configurations such as optical time domain reflectometry testing applications for fiber networks.

SUMMARY OF THE INVENTION

The present invention is an optical switching device and method for selectively optically connecting at least one input fiber in a fiber bundle to at least one output fiber in a fiber bundle. To perform the optical switching, a light directing mechanism is provided proximate a face of a fiber bundle that contains the input fiber. The light from the input fiber is directed toward the output fibers by varying the orientation of the light directing mechanism relative the face of the fiber bundle. The light directing mechanism thereby enables the light from the input fiber to be selectively directed to each of the output fibers. By selectively controlling the orientation of the light directing mechanism, the light from the input fiber can be scanned to any number of output fibers, thereby producing a 1×N optical switch.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

The present invention switching system and method can be used in a number of different applications where it is desired to selectively optically connect at least one input fiber in a fiber bundle to a least one output fiber in the same or different fiber bundle. The present invention switching system and method are particularly useful in the optical time domain reflectometry (OTDR) testing of fibers in a network. Accordingly, the present invention system and method will be described with regard to an exemplary OTDR testing application.

Figure 1:
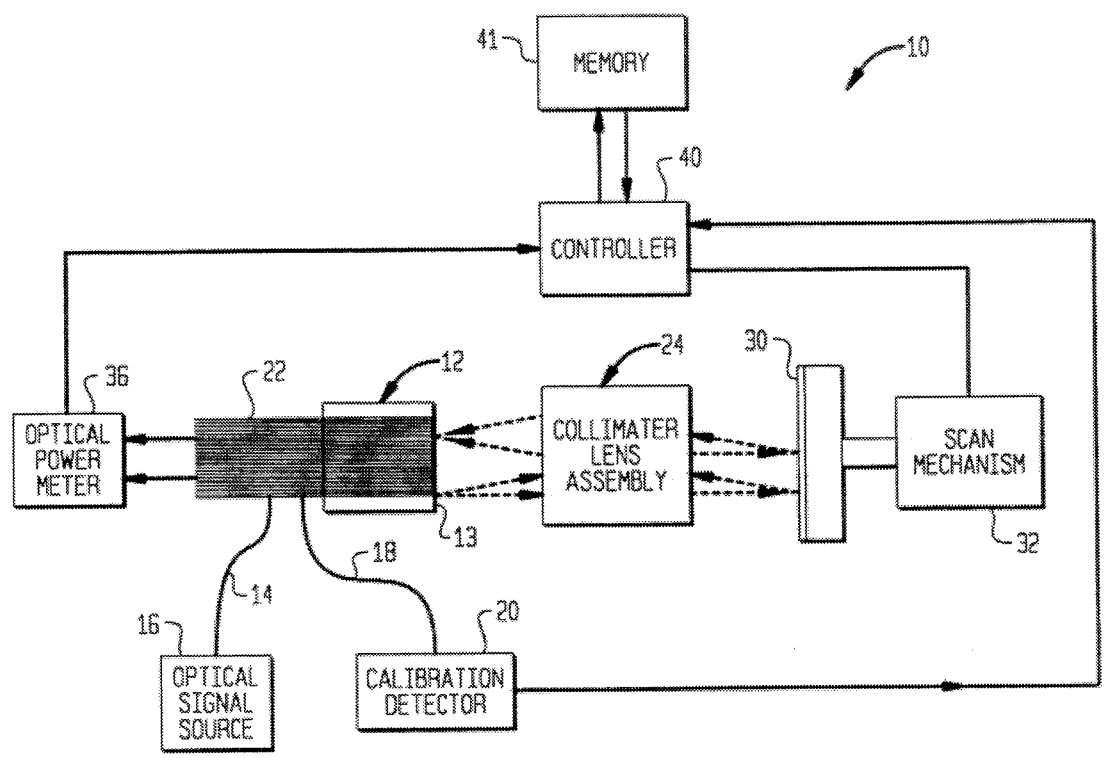
FIG. 1 is a schematic view of an embodiment of a switching assembly in accordance with the invention, wherein a scanning mirror is used to direct reflected light.

Referring to FIG. 1, the present invention switching system 10 is shown in conjunction with a fiber bundle 12. The size and configuration of the fiber bundle 12 is not critical to practicing the present invention. The fiber bundle 12 can be an organized array of individual optical fibers or can be any collection of fibers or groups of fibers in a configuration that is not organized. Furthermore, the fiber bundle 12 can contain any number of individual fibers.

A fiber contained within the fiber bundle 12 is selected as the input fiber 14 and is coupled to an optical signal source 16. It is possible for the input fiber 14 to terminate at any location on a face 13 of the fiber bundle 12. As such, the input fiber 14 need not be in the center of the fiber bundle 12. Optionally, a fiber 18 contained within the fiber bundle 12 can be selected as the calibration fiber and can be coupled to a calibration detector 20. The selected calibration fiber 18 can also terminate at a location on the fiber bundle face 13 which does not correspond to the bundle's center. The remainder of the fibers extending from the fiber bundle 12 opposite the fiber bundle face 13 are considered output fibers 22 and it is these output fibers 22 that can be selectively optically connected to the input fiber 14.

A collimator lens assembly 24 is positioned in front of the face 13 of the fiber bundle 12. The collimator lens assembly 24 contains at least one lens that collimates the light emitted from the input fiber 14 at the face 13 of the fiber bundle 12. The collimator lens assembly 24 should be proportionately sized with respect to the fiber bundle 12 so that the light emitted by the input fiber 14 will be collimated by the collimator lens assembly 24 substantially independent of the location of the input fiber 14 within the fiber bundle 12.

A reflector such as a mirror 30 is positioned at a location so as to receive the collimated light passing through the collimator lens assembly 24. As light impinges upon the mirror 30, the light is reflected back through the collimator lens assembly 24, wherein the reflected light becomes uncollimated and is focused at a particular location on the face 13 of the fiber bundle 12. The mirror 30 is coupled to a scan mechanism 32 that enables the orientation of the mirror 30 to be varied relative the path of the collimated light that impinges upon the mirror 30. The scan mechanism 32 can be an electromechanical mechanism coupled to the mirror 30 that can selectively change the orientation of the mirror 30 along a first and second axis. Alternatively, the scan mechanism can be an non mechanical device such as a liquid crystal or electro-optical deflector. The scan mechanism 32 enables the mirror 30 to selectively reflect light back against the face 13 of the fiber bundle 12 at any location on the fiber bundle face 13, substantially independent of the position of the input fiber 14 within the fiber bundle 12. As such, the mirror 30 and the scan mechanism 32 act in unison to produce a light directing mechanism that is capable of selectively directing the collimated light passing through the collimator lens assembly 24 back through the collimator lens assembly 24 and to any location on the fiber bundle face 13.

The present invention switching system 10 does not require the alignment of the individual fibers contained within the fiber bundle 12. As a result, when a fiber bundle 12 is first positioned in line with the collimator lens assembly 24, the position of the various output fibers 22 may be initially unknown. This requires the present invention switching system 10 to be calibrated prior to its use. To calibrate the switching system 10 for a particular fiber bundle 12, an optical detector 36, such as an optical power meter, is placed in the optical path of the output fibers 22 within the fiber bundle 12. A strong light signal is then emitted through the input fiber 14, wherein the light is passed through the collimator lens assembly 24, reflected off the mirror 30, redirected through the collimator lens assembly 24 and focused at the fiber bundle face 13. During such a calibration procedure, the orientation of the mirror 30 is changed by the scan mechanism 32, thereby causing the reflected input fiber light to scan across the face 13 of the fiber bundle 12.

As the reflected light from the input fiber 14 scans across the face 13 of the fiber bundle 12, each of the output fibers 22 in the fiber bundle 12 receives the reflected light for a corresponding time interval. As the light scans across the core of an output fiber 22, the light is propagated along the core and is detected by the optical detector 36. As a result, each time the optical detector 36 measures an increased light intensity for a particular output fiber 22, it is known that the reflected light scanning over the fiber bundle face 13 was received by a core of that output fiber.

A controller 40 is provided that is coupled to both the scan mechanism 32 and the optical detector 36. Each time the optical detector 36 detects increased light intensity from an output fiber 22, the controller 40 reads the positional address of the scan mechanism 32. That positional address is saved in a memory 41, wherein the memory 41 stores the positional address as corresponding to an output fiber 22. By scanning the face 13 of the fiber bundle 12, a scan mechanism positional address is obtained for each of the output fibers 22. The controller 40 therefore can determine the positional address of all the output fibers 22 in the fiber bundle 12. However, the identity of each output fiber at each positional address is not known. To determine the identity of each of the output fibers 22, each output fiber 22 in turn is connected individually to the optical detector 36. The light from the input fiber 12 is then directed to N known addresses on the fiber bundle face 13 so that the controller 40 can identify the specific positional address of each output fiber 22 on the face 13 of the fiber bundle 12.

During switching, the optical detector 36 and the controller 40 need not be the same sophisticated devices used during calibration. Rather, the optical detector 36 can be any circuit capable of detecting the light from the input fiber 14 and the controller 40 can be a simple circuit with an EPROM memory.

After calibration is complete, the particular orientations of the mirror 30 needed to direct reflected light to the individual respective output fibers 22 are known. The optical power meter 36 is removed and the switch is ready for use. Although the position of the various output fibers 22 becomes known after calibration, these positions may change slightly due to vibrations, thermal expansion or other such variables. In accordance with another aspect of the invention, the calibration detector 20 is provided to compensate for any subtle changes in the position of the output fibers 22. During operation, the light from the input fiber 14 is intermittently scanned across the calibration fiber 18 on the face 13 of the fiber bundle 12. As the light strikes the calibration fiber 18, the intensity of the light is detected by the calibration detector 20. If the intensity of light detected by the calibration detector 20 changes, it is assumed that there has been a positional shift in the fiber bundle 12. The controller 40, coupled to the calibration detector 20, compensates the scan pattern until the calibration detector 20 again properly receives light from the input fiber 14. By correcting the scan pattern for the calibration detector 20, the scan pattern is corrected for all the other output fibers 22 in the fiber bundle 12.

Although the shown embodiment uses only one calibration fiber 18 within the fiber bundle 12, it should be understood that a plurality of fibers in the fiber bundle 12 can be designated as calibration fibers and can be coupled to the calibration detector 20. By using a plurality of calibration fibers at different points within the fiber bundle 12, more accurate corrections can be made by the controller 40 should the initial position of the output fibers 22 in the fiber bundle 12 be slightly altered.

Figure 2:
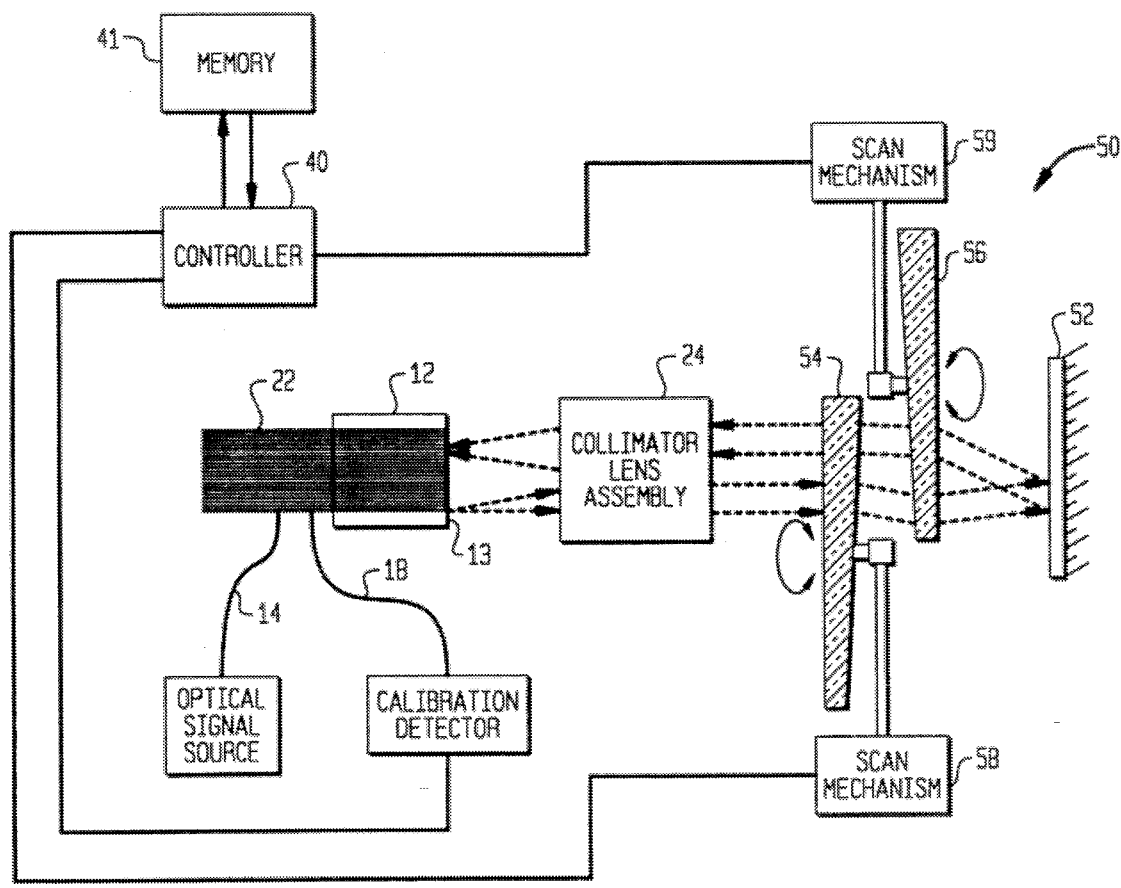
FIG. 2 is a schematic view of an alternate embodiment of the switching assembly, wherein prisms are used to direct reflected light.

An alternate embodiment 50 of a switching system in accordance with the invention and having substantially increased light directing resolution is shown in FIG. 2. In this embodiment, the fiber bundle 12, containing an input fiber 14, output fibers 22 and at least one calibration fiber 18 are substantially identical to those components depicted in FIG. 1 and are identified by like reference numbers for clarity. Similarly, the collimator lens assembly 24 for collimating the light of the input fiber 14 is also substantially the same as the previous embodiment. In FIG. 2, a fixed mirror 52 is provided, wherein the plane of the fixed mirror 52 is perpendicular to the path of the collimated light passing through the collimator lens assembly 24. Disposed between the collimator lens assembly 24 and the fixed mirror 52 is a light directing mechanism that includes two prisms 54, 56 coupled to a rotating scan mechanism 58, 59 that enables each prism 54, 56 to be rotated. The rotating scan mechanisms 58, 59 can include most any rotating control but preferably include galvo scanners. As the collimated light from the collimator lens assembly 24 passes through the two prisms 54, 56, the light is bent and is reflected off the fixed mirror 52 at an angle. The two prisms 54, 56 provide a form of optical leverage which allows for the full rotation of the prisms 54, 56 to convert to a very small tilt of the light's path. This increases accuracy and decreases errors created by drift and shaft wobble. The reflected light is then directed back through the two prisms 54, 56 and back through the collimator lens assembly 24, wherein the light is refocused onto the fiber bundle 12. Each of the prisms 54, 56 should have a wedge angle selected so that the controlled rotation of the two prisms 54, 56 enable the light from the input fiber 14 to be scanned across the entire width and height of the fiber bundle 12. The wedge angle for each of the two prisms 54, 56 is determined by the refractive index of the material used to make the prisms 54, 56 and the size of the fiber bundle face 13. The wedge angle for each of the two prisms is selected so that the reflected light passing through the two prisms can be selective directed to any location on the fiber bundle face 13. The rotational movement of the two prisms 54, 56, via the scan mechanisms 58, 59, is controlled by the controller 40. The controller 40 controls the scan mechanisms 58, 59 to produce a desired scan pattern and adjusts the scan pattern during operation, if needed, for calibration.

Although the embodiment of FIG. 1 uses a light directing mechanism that includes a moveable mirror with no prisms and the embodiment of FIG. 2 uses a light directing mechanism that includes a fixed mirror with two moving prisms, it will be understood that many other configurations of a light directing mechanism can be used to reflect light from the input fiber and scan that light across the face of the fiber bundle. For example, a hybrid configuration of a light directing mechanism can be produced using a single prism and a tilted mirror, wherein the tilted mirror and the prism can be selectively rotated. It is also possible to configure the present invention so that it provides a transmissive version of a switch. In such a configuration the input fiber and the output fiber can be part of different optical bundles. In such a configuration, a reflective surface can be used to direct light from one fiber bundle to another, or the reflective surface can be eliminated whereby the light from one fiber bundle impinges directly upon another after passing through a light directing mechanism. In such alternate embodiments, separate lens arrangements can be used to collimate the incoming light and focus the outgoing light. All such alternate embodiments of a light directing mechanism are intended to be included within the scope of this disclosure.

Figure 3:
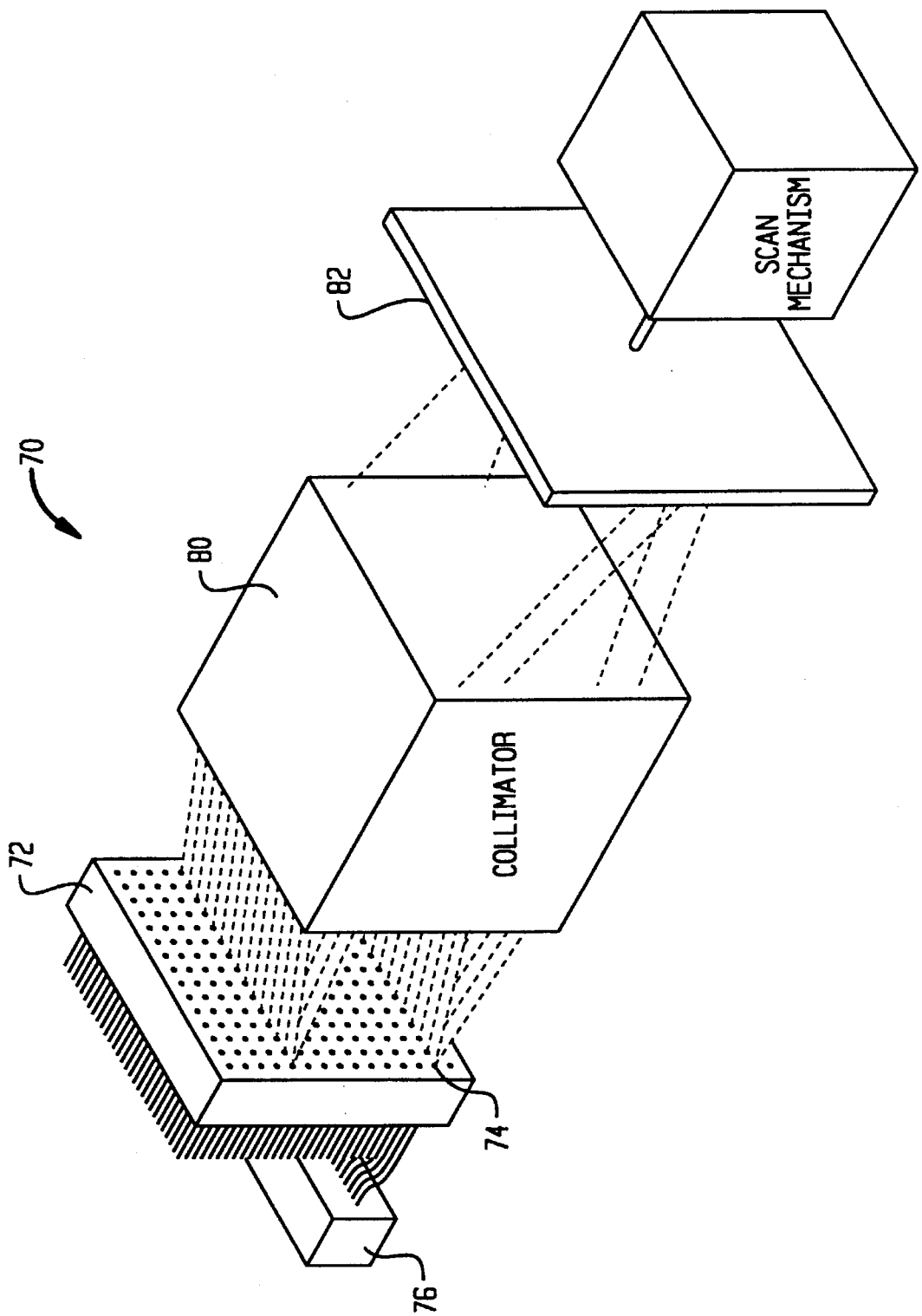
FIG. 3 is a schematic view of another alternate embodiment of the switching assembly containing multiple fiber inputs that are scanned in unison.

Referring to FIG. 3, yet another embodiment 70 of a switch system 70 in accordance with the invention is shown. In this embodiment, the fiber bundle 72 is an organized matrix of fibers arranged in uniform rows and columns. In such an organized fiber bundle configuration, a plurality of fibers can be designated as input fibers 74 and can be coupled to a light source 76. The plurality of fibers selected as input fibers 74 can be any row of the matrix, any column of the matrix or any portion thereof. For the purposes of example, the shown embodiment illustrates the row 78 second to the bottom of the matrix as containing the input fibers 74.

A collimator lens assembly 80 is provided that has a sufficient size to collimator the light produced by all of the input fibers 74. The collimated light is then directed to a mirror 82 that reflects the light back through the collimator lens assembly 80 and back toward the fiber bundle 72. By adjusting the orientation of the mirror 82, whole rows of the fiber bundle 72 can simultaneously be scanned. The result is the substantially simultaneous switching of one entire row of input fibers to one of several entire rows of output fibers. In such a configuration, a single fiber can be designated as a calibration fiber or any plurality of fibers can be used as calibration fibers provided the calibration fibers are positioned to be simultaneously scanned by the input fiber light reflecting from the mirror.

It will be understood that many components of the present invention as described and illustrated have functional equivalents that can be used in alternate embodiments by a person skilled in the art. All such modifications and alternate embodiments are intended to be included within the scope of the present invention as defined within the appended claims.

What is claimed is:

1. A method for optical switching between at least one input fiber and at least one output fiber, said at least one output fiber being located in a fiber bundle, the method comprising:

positioning a light directing mechanism proximate a face of said fiber bundle;

transmitting a test light signal through said input fiber, wherein said test light signal is directed toward light directing mechanism;

collimating said test light signal to produce a collimated test light signal;

redirecting said collimated test light signal with said light directing mechanism;

focusing said collimated test light signal at said face of said fiber bundle;

altering said light directing mechanism to cause a scanning of said face of said fiber bundle with said test light signal; and identifying an orientation of said light directing mechanism during the scanning that directs light to said at least one output fiber.

2. The method according to claim 1, wherein said light directing mechanism includes a reflective surface and said step of redirecting said collimated test light signal includes reflecting said collimated test light signal toward said at least one output fiber with said reflective surface.

3. The method according to claim 1, wherein said light directing mechanism includes at least one prism and said step of redirecting said collimated test light signal includes passing said collimated test light signal through said at least one prism.

4. The method according to claim 3, wherein the step of altering said light directing mechanism includes rotating said at least one prism, wherein said at least one prism scans said collimated test light signal.

5. The method according to claim 2, further including the steps of:
positioning a collimator between said fiber bundle and said reflective surface, wherein said collimator collimates said test light signal emitted by said at least one input fiber when said test light signal travels toward said reflective surface and said collimator focuses said test light signal at said at least one output fiber when said test light signal is redirected back from said reflective surface.

6. The method according to claim 5, further including the step of identifying at least one position on said fiber bundle corresponding to said at least one output fiber.

7. The method according to claim 6, wherein said step of identifying a position includes:
coupling an optical detector to said at least one output fiber;
scanning said test light signal reflected from said reflecting surface across said fiber bundle using a scan mechanism; and
storing a positional address from said scan mechanism when said optical detector detects said test light signal reflected from the reflecting surface as it scans across said fiber bundle.

8. The method according to claim 5, further including the step of calibrating said scanning pattern.

9. The method according to claim 8, wherein said step of calibrating said scanning pattern includes:
coupling an optical detector to at least one selected fiber in said fiber bundle, wherein said at least one selected fiber corresponds in location to a known scanning position contained within said scanning pattern;
scanning said test light signal reflected from said reflective surface in said scanning pattern;
detecting if said test light signal reflected from said reflective surface scans across said at least one selected fiber when said scanning pattern is at said known scanning position; and
altering said scanning pattern so that said test light signal reflected from said reflective surface does scan across said at least one selected fiber at said known scanning position.

10. An optical switching device for selectively optically connecting at least one first fiber in a fiber bundle to at least one second fiber in the fiber bundle, comprising:
a collimator for collimating light emitted by said at least one first fiber and producing a substantially collimated beam; and
a light directing mechanism for reflecting said substantially collimated beam back through said collimator along an optical path, wherein said collimator focuses said substantially collimated beam at said at least one second fiber in the fiber bundle.

11. The device according to claim 10, wherein said light directing mechanism includes a reflective mirror and a scan mechanism coupled to said mirror for selectively altering the orientation of said mirror relative said collimator.

12. The device according to claim 10, wherein said light directing mechanism includes a reflective mirror and at least one prism disposed between said mirror and said collimator, whereby said substantially collimated beam passes through said at least one prism.

13. The device according to claim 12, wherein said at least one prism has a given orientation relative said collimator and said light directing mechanism further includes a scan mechanism for altering the orientation of said at least one prism relative said collimator.

14. The device according to claim 12, wherein said scan mechanism is capable of selectively rotating said at least one prism.

15. The device according to claim 10, wherein said mirror is fixed at one orientation relative to said collimator.

16. The device according to claim 10, wherein said device is configured to have multiple second fibers, and wherein said light directing mechanism is capable of selectively controlling said optical path to form a scan pattern, whereby the light emitted from said at least one first fiber is scanned across each of said multiple second fibers.

17. The device according to claim 16, further including a memory for storing a positional address in said scan pattern that corresponds to each of said multiple second fibers.

18. The device according to claim 10, wherein said device is configured to have a plurality of first fibers and a plurality of second fibers.

19. A device for determining the location of at least one fiber contained within a fiber bundle, comprising:
a light source coupled to a first of said fibers within said fiber bundle, whereby light from said light source is emitted through said first of said fibers;
a collimator disposed proximate said fiber bundle for collimating the light emitted by said first of said fibers;
a light directing mechanism for reflecting light emitted from said first of said fibers back toward said fiber bundle in a scanning pattern;
a detector coupled to at least one second fiber in said fiber bundle, wherein said detector detects when the light reflected by said light directing mechanism impinges upon said at least one second fiber;
a controller coupled to said light directing mechanism and said detector for determining a positional address associated with said light detecting mechanism each time the light reflected by said reflective surface is detected by said detector; and
a memory for storing each said positional address.

20. The device according to claim 19, wherein said light directing mechanism includes a mirror and a scan mechanism for selectively altering said mirror relative said fiber bundle.

21. The device according to claim 19, wherein said light directing mechanism includes a mirror and at least one prism disposed between said mirror and said fiber bundle, wherein the light emitted by said first of said fibers passes through said at least one prism.

22. An optical switching device for selectively optically connecting at least one 1×M array of fibers in a fiber matrix to at least one second 1×M array of fibers in the fiber matrix, comprising:

a collimator for collimating light emitted by said at least one first 1×M array and producing substantially collimated beams; and a light directing mechanism for reflecting said substantially collimated beams back through said collimator along an optical path, wherein said collimator focuses said substantially collimated beams at said at least one second 1×M array in the fiber matrix.

23. The device according to claim 22, wherein said light directing mechanism includes a reflective mirror and a scan mechanism coupled to said mirror for selectively altering the orientation of said mirror relative said collimator.

24. The device according to claim 22, wherein said light directing mechanism includes a reflective mirror and at least one prism disposed between said mirror and said collimator, whereby said substantially collimated beams pass through said at least one prism.

\* \* \* \* \*